US008024615B2

(12) United States Patent
Tarta (10) Patent No.: US 8,024,615 B2
(45) Date of Patent: Sep. 20, 2011

(54) STEADY STATE COMPUTER TESTING

(75) Inventor: Mihail G. Tarta, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 386 days.

(21) Appl. No.: 12/110,350

(22) Filed: Apr. 28, 2008

(65) Prior Publication Data

US 2009/0271662 A1 Oct. 29, 2009

(51) Int. Cl.
*G06F 11/00* (2006.01)
(52) U.S. Cl. .................. 714/37; 702/182; 702/183
(58) Field of Classification Search ............ 714/37; 702/182, 183, 186
See application file for complete search history.

(56) References Cited

U.S. PATENT DOCUMENTS

| | | | |
|---|---|---|---|
| 6,324,492 B1 | 11/2001 | Rowe | |
| 6,446,218 B1* | 9/2002 | D'Souza | 714/4 |
| 6,654,699 B2* | 11/2003 | Millard | 702/108 |
| 6,721,615 B2 | 4/2004 | Fava et al. | |
| 6,915,344 B1 | 7/2005 | Rowe et al. | |
| 6,950,816 B1* | 9/2005 | Quernemoen et al. | 1/1 |
| 7,117,309 B2 | 10/2006 | Bearden | |
| 7,185,232 B1 | 2/2007 | Leavy et al. | |
| 7,630,862 B2* | 12/2009 | Glas et al. | 702/186 |
| 2002/0091988 A1 | 7/2002 | Murphy | |
| 2004/0139433 A1 | 7/2004 | Blythe et al. | |
| 2005/0193269 A1 | 9/2005 | Haswell et al. | |
| 2006/0095312 A1* | 5/2006 | Conti et al. | 705/10 |
| 2007/0006153 A1 | 1/2007 | Sultan | |
| 2007/0169199 A1 | 7/2007 | Quinnell et al. | |
| 2007/0185984 A1 | 8/2007 | Roth | |
| 2009/0271662 A1* | 10/2009 | Tarta | 714/37 |
| 2009/0307530 A1* | 12/2009 | Tarta | 714/38 |

FOREIGN PATENT DOCUMENTS

WO 2006040467 A3 4/2006

OTHER PUBLICATIONS

Lu, et al., "A Feedback Control Approach for Guaranteeing Relative Delays in Webservers", Seventh IEEE Proceedings Real-Time Technology and Applications Symposium, 2001. pp. 51-62.
Aboulnaga, et al., "Self-tuning Histograms: Building Histograms Without Looking at Data", Proceedings of the 1999 ACM SIGMOD international conference on Management of data. pp. 181-192.
Wang, "Cost Effective Soft Error Mitigation in Microprocessors", Dissertation, University of Illinois at Urbana-Champaign, 2007. 162 Pages.
Saylor, et al., "Large Scale Itanium® 2 Processor OLTP Workload Characterization and Optimization", Second International Workshop on Data Management on New Hardware (DaMoN 2006) Jun. 25, 2006, Chicago, IL, U.S.A. 7 Pages.

(Continued)

*Primary Examiner* — Philip Guyton (57) ABSTRACT

A steady state value of each parameter in a set of one or more parameters of a computer system under test is defined, and acts related to the parameter are performed while the system under test is processing one or more test workloads. The acts can include comparing a working value of the parameter with the steady state value of the parameter, as well as operating on one or more workloads to bring the working value closer to a steady state value. This can include increasing or decreasing the working value of the parameter, such as by admitting one or more workloads to the system under test or cancelling one or more workloads from the system under test.

17 Claims, 5 Drawing Sheets

OTHER PUBLICATIONS

Stillger, et al., "LEO—DB2's LEarning Optimizer", Proceedings of the 27th VLDB Conference, Roma, Italy, 2001. 10 Pages.

Bharry's WebLog "Managing Quality (part 4)—Stress Testing" MSDN Blogs. Webpage available at http://blogs.msdn.com/bharry/archive/2007/02/11/managing-quality-part-4-stress-testing.aspx.

Menasce, et al., "Preserving QoS of Ecommerce Sites Through SelfTuning:A Performance Model Approach", EC'01, Oct. 14-17, 2001, Tampa, Florida, USA. 11 Pages.

Tsai, et al., "Reliability Testing of Applications on Windows NT", Proceedings of the 2000 International Conference on Dependable Systems and Networks. 10 Pages.

Weikum, et al., "Self-tuning Database Technology and Information Services: from Wishful Thinking to Viable Engineering", Proceedings of the 28th VLDB Conference, Hong Kong, China, 2002. 12 Pages.

Cherskov, "Windows CE .NET Long-Haul Testing Scenarios and Results", Microsoft Corporation, 2003. webpage available at http://msdn2.microsoft.com/en-us/library/ms836785(printer).aspx.

* cited by examiner

STEADY STATE COMPUTER TESTING

BACKGROUND

Bugs and other failures to handle normal and exceptional conditions during execution of computer software can result in substantial harm to the software owner or provider, including financial losses, damage to property, and even personal injury, depending on the failure and the type of software.

In order to identify bugs in software and hardware prior to the general release or use by the software developer or publisher, programmers often use one or more computer testing systems to identify and fix errors. Such computer testing systems can include software running on the system under test, software running on another remote computer system that may be dedicated to managing computer tests, or some combination of these. Such computer testing systems are often used to reveal bugs and other failures during the development process, before the software is put in production.

Computer systems that are tested by such computer testing systems include not only individual personal computers, but also network servers, such as wide area network servers (such as Internet Web servers), database servers, and file servers. Information providers, such as search engine providers, often need to scale their operations so that they are able to service high rates of requests without sacrificing reliability. One way of doing this is to incorporate multiple servers into a networked system. A collection of servers such as this is sometime referred to as a server "farm" or "cluster." Typically, in such a farm or cluster, multiple individual servers operate to render services and responses. As with other computer systems, software and hardware used in such server farms and clusters are typically tested prior to general release or use.

The tests performed on computer systems can include stress testing, long-haul testing, and combinations of these, in addition to other types of testing. Stress testing intentionally puts a system under excessive load, typically by submitting a high rate of workloads to the system under test, while possibly denying the system resources to process the workloads. The system under test may not ultimately process the workloads, but the system is expected to fail gracefully, without corruption or loss of data. On the other hand, long-haul testing typically tries to approximate average or typical usage of a system under test with enough resources to satisfy workloads, repeated over a long period. While satisfying an individual action or operation might take seconds or minutes, long-haul testing usually is designed as a long running set of operations that are typically performed over days or weeks, making sure that the system under test remains operable throughout the test period. Long-haul testing is often able to reveal bugs in a system under test that would not have been apparent from stress testing or other types of computer testing that are done over short periods of time. Such bugs may include resource leak bugs, timing bugs, hardware-related bugs, and counter-overflow bugs.

In long-haul testing, an experienced programmer often chooses a workload level that the programmer would expect to be placed on the system under test during actual use of the system. For example, the programmer may expect that a certain server system would typically serve about ten client machines having about one-hundred users, and that each user would execute a certain number of operations involving the server system. Thus, programmers configure the testing system to subject the server system under test to that level of machines, users, and operations during the long-haul test.

SUMMARY

Whatever the advantages of previous computer system testing tools and techniques, they have neither recognized the steady state computer testing tools and techniques described and claimed herein, nor the advantages produced by such techniques.

In one embodiment, the tools and techniques can include defining a steady state value of each parameter of a set of one or more parameters of a computer system under test, and performing acts related to each parameter of the set of parameters while the system under test is processing one or more test workloads. Specifically, the acts can include determining whether a working value of a parameter is below a steady state value. If so, then the acts can include operating on one or more of the workloads to increase the working value of the parameter. Likewise, the acts can include determining whether the working value of the parameter is above the steady state value. If so, then the acts can include operating on one or more of the workloads to decrease the working value of the parameter.

Operating on the workload(s) to increase the working value of the parameter can include admitting one or more workloads to the system under test, or adjusting up the system under test's usage of a workload already residing in the system under test. Operating on the workload(s) to decrease the working value of the parameter can include cancelling one or more workloads residing in the system under test, or adjusting down the system under test's usage of a workload already residing in the system under test. The workloads residing in the system under test can also be dynamically sorted based on runtime information from the system under test to provide a basis for choosing workload(s) to cancel or adjust.

The testing method may include a long-haul steady state test. Moreover, the steady state value of at least one parameter of the set of parameters may be modified during the test so that the value is at a low steady state value during a first period of time and a high steady state value during a second period of time.

Workloads can be chosen for admission to, or cancellation from, the system under test based on an expected effect that the admission or cancellation will have on the working values of the at least two parameters in the set of parameters.

In another embodiment of the tools and techniques an execution context interface can include information about a system under test. The execution context interface can be used to communicate with the system under test. In addition, a policy interface can be used for two determinations while the system under test is processing one or more workloads. First, the policy interface can be used to determine whether the system under test is in an underflow state with respect to a parameter of the system under test. If so, then on one or more workloads can be operated on to increase a working load on the system under test. Second, the policy interface can be used to determine whether the system under test is in an overflow state with respect to the parameter. If so, then one or more workloads can be operated on to decrease the working load on the system under test.

Operating on one or more workloads to increase the working load can include admitting no more than a predetermined maximum number of admission workloads after each of multiple times that the feedback from the system under test is reviewed. Similarly, operating on one or more workloads to decrease the working load can include cancelling no more than a predetermined maximum number of cancellation workloads after each of multiple times that feedback from the system under test is reviewed.

In yet another embodiment of the tools and techniques, feedback can be received from a system under test, where the feedback includes information about a working value of each parameter in a set of one or more parameters of the system under test. For each parameter in the set of parameters, the feedback can be used to compare the working value of the parameter with a steady state value, and can be used to operate on one or more workloads to bring the working value of the parameter closer to the steady state value.

Additionally, a first steady state value can be modified so that the first steady state value is at a low value during a first period of time and a high value during a second period of time. Similarly, a second steady state value can be modified so that the second steady state value is at a high value during the first period of time and a low value during the second period of time.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Described embodiments are directed to techniques and tools for improved testing of computer systems. Such improvements may result from the use of various techniques and tools separately or in combination.

Such techniques and tools may include evaluating one or more parameters of a system under test to determine whether the system is in an underflow state, an overflow state, or a steady state as to one or more system parameters. This may be based on feedback received from the system under test about working value(s) of the system parameter(s). If the system is in a state of underflow or overflow as to one or more system parameters, as described by the steady state definition, then the techniques and tools can also include operating on workloads to bring the working values of the system parameter(s) closer to the steady state. For example, this could include admitting one or more workloads to the system under test or modifying the way that the system under test processes one or more workloads already admitted to the system under test. Such modification could include cancelling (e.g., instructing the system under test to cancel) one or more workloads from the system under test.

These tools and techniques may be utilized while the system under test is being tested, allowing the testing system to dynamically adjust the test to maintain the system under test at a defined steady state. Network queuing models with feedback have been used in other applications, such as database optimizers, workload characterization, performance modeling, etc., but not for dynamically managing workflow during computer testing to maintain a steady state, nor has such use been suggested.

In contrast with prior computer testing techniques where an experienced person simply pre-defined the rate and type of workloads to be submitted to the system under test during the testing period, the tools and techniques described herein can allow for increased dynamic control of the system under test during the testing period. Moreover, the system under test can be maintained at or near a defined target steady state value of a system parameter representing a load on one or more resources in the system under test. Indeed, it has been found that the prior techniques are problematic, especially for complex server systems, such as many server farms and clusters. The precise operations of such complex systems is difficult to predict, and pre-defined constant workload levels may not keep the system under test sufficiently busy for the entire testing period to reveal some types of bugs and other flaws. Or, the constant workload levels may overwhelm and cripple the system under test so that it does not continue processing workloads for a long enough period of time to reveal some types of bugs and other flaws.

Accordingly, one or more substantial benefits can be realized from the steady state testing tools and techniques described herein. For example, steady states can be defined in terms of the states of one or more resources of the system under test, providing for tests that more closely match real-world conditions and loads. Moreover, defining the steady states in terms of one or more system parameters of the system under test allows for long-haul tests where the system under test is required to carry a heavy workload, but not a workload that will likely crash the system under test during the testing period. In addition, if stress testing is desired, then the target steady state values of one or more system parameters can be set to high levels that will subject the system under test to a defined state of stress. In either scenario, the tools and techniques described herein allow for increased control of the testing conditions and the system under test during the testing period, thereby increasing the likelihood of finding and fixing bugs and other flaws in the system under test.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

Exemplary Computing Environment

Figure 1:
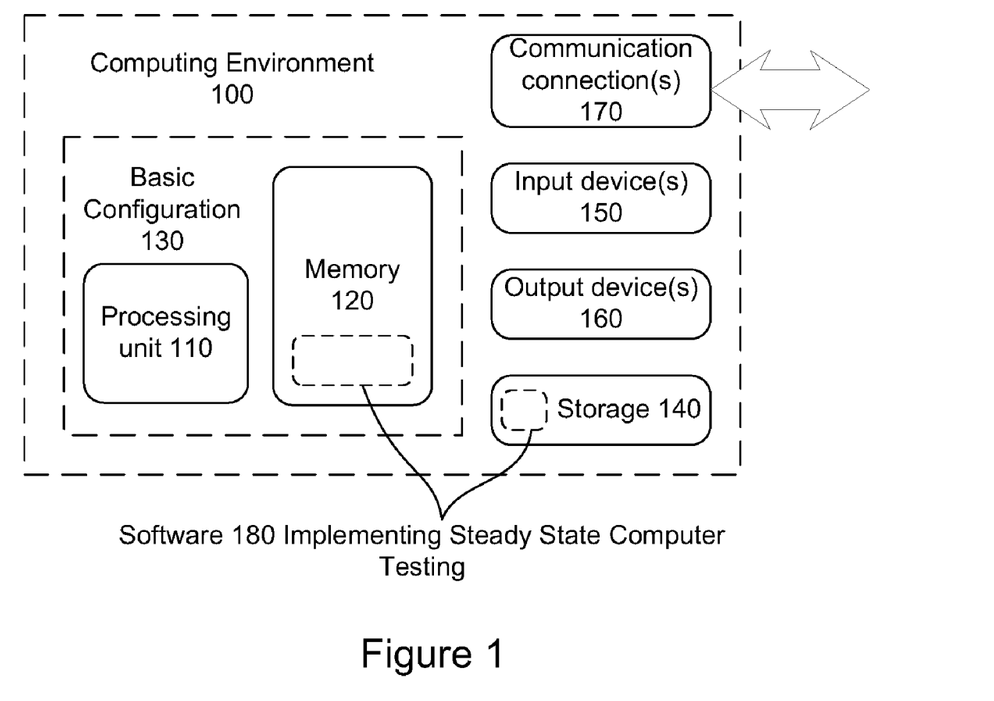
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as a testing system, and one or more such computing environments can form a system under test. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing steady state testing tools and/or techniques for testing a computer system.

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. For example, when testing a system, the communication connection(s) may be used to communicate workloads, feedback, and other information between a system under test computing environment and a testing system computing environment. Alternatively, the system under test and the testing system could reside partially or entirely within the same computing environment. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," "operate," "increase," "decrease," "admit," "cancel," and "apply" to describe computer operations in a computing environment. These and other similar terms are high-level abstractions for operations performed by a computer, and should not be confused with acts performed by a human being. The actual computer operations corresponding to these terms vary depending on the implementation.

Steady State Testing System and Environment

Figure 2:
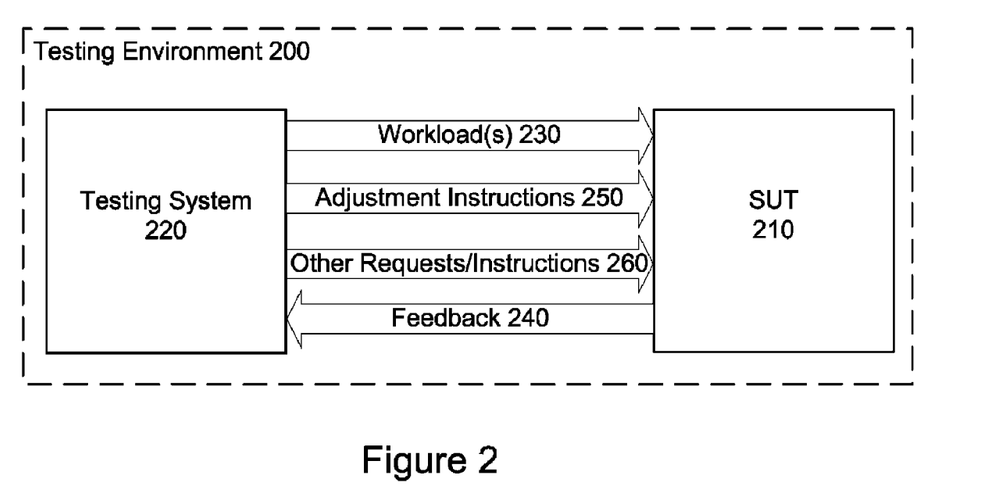
FIG. 2 is a block diagram of a computer testing environment in which one or more of the described embodiments may be implemented.

FIG. 2 is a block diagram of a testing environment (200) in conjunction with which one or more of the described embodiments may be implemented. The testing environment (200) includes a system under test (210) and a testing system (220). As noted above, these systems (210 and 220) may be part of the same computing environment or they may reside in separate computing environments that are connected by one or more wired or wireless communication connections. In general, the system under test (210) is configured to operate the hardware and/or software being tested. The testing system (220) is generally configured to administer one or more computer tests to the system under test (210). For example, the testing system (220) may admit (i.e., send for processing) one or more workloads (230) to the system under test (210) via a communication connection. The system under test (210) receives and processes the workload(s) (230).

As used herein, workload(s) (230) are instructions submitted to the system under test (210) to prompt the system to perform one or more actions. Such actions may include, for example, file actions if the system under test (210) is a file server, transactions if the system under test (210) is a database server, and HTTP requests if the system under test (210) is a Web server. A workload could include other types of instructions, such as fault injection workloads that kill a process or bring a machine down, and consistency violations that are logically inconsistent with what would normally happen in the system under test (210). A single workload could even include multiple types of instructions, such as a single workload that includes database queries and file action requests.

The testing system (220) also receives feedback (240) from the system under test (210) while the test is being performed. This feedback can include information about the state of one or more system or environment parameters (referred to herein collectively as system parameters) of the system under test (210). The testing system (220) is configured to modify the test to bring the working values of these system parameters closer to one or more defined target steady state values. Such steady state values could be represented in various forms, such as precise values (for example, 80% CPU utilization, where the system parameter would be considered at the steady state only if it was at 80%) or value ranges (for example, 77% to 83% CPU utilization, where the system parameter would be considered at the steady state so long as it was between 77% and 83%). Moreover, the steady state values may be modified during a computer test.

The system parameters can be any parameters that represent a state of the system under test (210) while the test is ongoing. Although it is often useful to choose parameters that represent some type of load on the system under test (210) and/or that are associated with a resource of the system under test, the parameters could be software parameters, hardware parameters, or combinations of the two. For example, in a test simulating on-line transaction processing (OLTP) behavior, a system parameter could be the number of transactions blocked and waiting for a resource. For a data warehouse (DW) scenario, the total disk spill size (the total amount of disk space being used as if it were main memory) could be a parameter. Other examples of hardware system parameters include the CPU queue length, disk queue length, and OS paging (a measure of the number of storage units in virtual memory). Other examples of software system parameters include performance counters, internal system under test runtime data structures, and online system under test log analysis (such as by using a real-time log analysis tool). Such software parameters can often reveal information about loads on hardware components, as well as loads on software components. The system parameters could also be transaction-based parameters, such as database transactions, Web page requests, or faults per unit time. Many of the foregoing types of parameters are already tracked and observable in existing computer systems, although the testing system, the system under test, or both may be modified to track and observe additional types of parameters.

The parameters can represent the state of multiple resources or even multiple machines that form a system under test. For example, in a server farm, a parameter can be an average of the parameter for each machine in the farm (such as an average disk queue length for the machines in the farm), a total parameter for all the machines in the farm (such as the sum of the disk queue lengths for all the machines in the farm), a maximum or minimum of the parameter for all machines in the farm (such as the disk queue length of the machine having the highest disk queue length value), or some other parameter value for the server farm system.

The target steady state values of the system parameters can be defined in such a way that they are at different values at different times during a test. This can be done to simulate workload peaks and migrating workloads that are often present in real-world usage of computer systems. For example, in data warehouses, workload types often vary in phases. The phase where data is loaded into the warehouse typically has a heavy load of disk write operations. That phase could last for a day, but could be followed by a week of mainly querying and reading data, with a heavy load of disk read operations. This could be followed by another day of data loading, etc. Such migrating workloads can be simulated by having a first parameter that represents disk read operations, and a second parameter that represents disk write operations. Thus, in the first day of a test, the first parameter can be set to a low steady state value and the second parameter can be set to a high steady state value; in the following week of the test, the first parameter can be set to a high steady state value, and the second parameter can be set to a low steady state value; and so forth. For example, the steady state could be defined as twenty percent disk writes and eighty percent disk reads for every weekday, and eighty percent disk writes and twenty percent disk reads for every weekend day, for a total testing time interval of one month.

As will be described in more detail below, the feedback (240) on the working value(s) of the system parameters can be used to monitor whether the system under test (210) is in a state of underflow or overflow with respect to the parameter(s). This information can be used to operate on one or more workloads to bring the system under test (210) closer to a steady state while the test is ongoing.

The testing system (220) can also send modification instructions (250) to the system under test (210), instructing the system under test to modify one or more workloads (230), or to modify the way that the testing system (220) processes or responds to the workload(s) (230). For example, the testing system (220) may cancel one or more of the workloads (230) previously admitted to the system under test by instructing the system under test (210) to cancel workload(s) (230).

The testing system (220) may also submit other requests and instructions (260) to the system under test, such as instructing the system under test (210) to terminate all processing when the test is complete.

Figure 3:
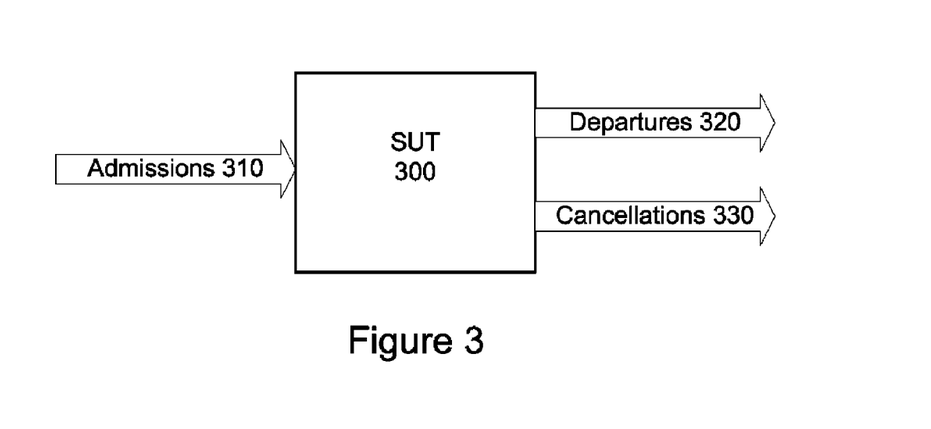
FIG. 3 is a block diagram illustrating the flow of workloads through a system under test.

FIG. 3 illustrates the flow of workloads through a system under test (300), which is similar to the system under test (210) discussed above with reference to FIG. 2. The system under test (300) receives admissions of workloads (310), such as workloads from a corresponding testing system. As noted above, each workload admitted to the system under test (300) prompts the system under test to take one or more actions. Taking one or more actions prompted by a workload is also referred to herein as processing the workload.

If the system under test (300) completes the action(s) prompted by the workload, then the workload is considered a departure (320). The action(s) prompted by the workload may be adjusted before the action(s) are completed, such as where the system under test (300) receives a modification instruction from a corresponding testing system to adjust one or more workload parameters.

If the system under test (300) cancels the workload before it is completely processed, such as where a testing system submits a cancellation instruction to the system under test (300), then the workload is considered a cancellation (330). Thus, the workloads that reside in the system under test (300) are the admissions (310) that have not yet become departures (320) or cancellations (330). Such workloads may be queued in the system under test (300) waiting to be processed, or they may be partially processed by the system under test (300).

Figure 4:
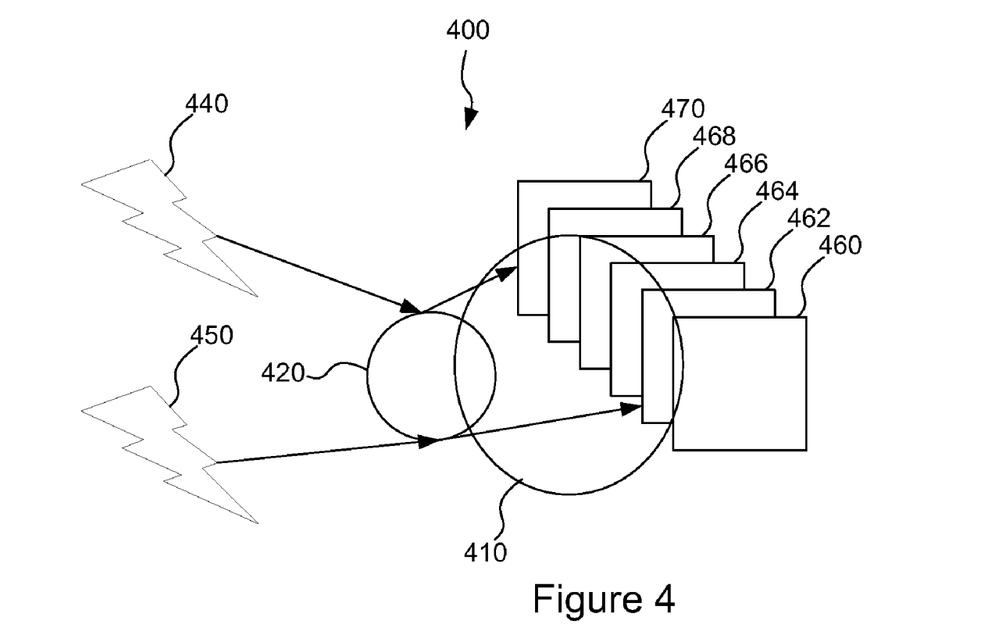
FIG. 4 is a schematic diagram of a computer testing system in which one or more of the described embodiments may be implemented.

Referring now to FIG. 4, in one embodiment a testing system (400) includes an execution context interface (410), a policy interface (420), an admissions timer (440), and a cancellations timer (450). Also illustrated in FIG. 4 are workloads (460, 462, 464, 466, 468, and 470) residing in the corresponding system under test (not shown). In the illustration of FIG. 4 (and in the illustration of FIG. 5 discussed below), the workloads (460, 462, 464, 466, 468, and 470) were admitted to the system under test in the order shown, with the front workload (460) having been admitted first, and the rear workload (470) having been admitted last.

The execution context interface (410) includes information about the system under test that allows the testing system (400) to interact or communicate with the system under test. For example, the execution context interface (410) can include run-time information about the location and identification of the system under test, such as the server name for a server system under test, connection attributes, execution parameters, etc. In some implementations, the execution context interface (410) includes a group of read/write properties of the system under test, which are used by both the policy interface (420) and the workloads (460, 462, 464, 466, 468, and 470). The execution context interface (410) can include execution parameters that the testing system (400) sends to the system under test to specify the way that a particular workload (460, 462, 464, 466, 468, or 470) is processed by the system under test. For example, if a workload includes two modules (such as one that requires more work by a processor and another that requires more work by a storage device), the testing system (400) can pass execution parameters to the system under test to specify the amount of work to be done on each of the two modules. The testing system (400) can send these workload execution parameters to the system under test along with the corresponding workload itself, or separately.

The testing system (400) may also adjust the execution parameters for one or more workloads while the workload(s) reside in the system under test by sending adjustment-type modification instructions to the system under test. Moreover, the testing system (400) can cancel one or more workloads residing in the system under test by sending one or more cancellation-type modification instructions to the system under test. The context for such cancellation instructions can also be provided by the execution context interface (410).

Referring still to FIG. 4, the policy interface (420) identifies the steady state system parameters of the system under test. The policy interface (420) also defines the target steady state values for such system parameters, and defines how the testing system (400) will maintain the steady state during the test. Thus, in general, the testing system (400) is configured to receive feedback from the system under test about the working value(s) of the steady state parameter(s) while a test is ongoing. The testing system (400) is also configured to admit a sufficient number of new workloads to the system under test, or adjust the processing of a sufficient number of workloads already admitted to the system under test, to bring the working value(s) of the system parameter(s) of the system under test closer to steady state value(s), as defined in the policy interface (420).

In the implementation illustrated in FIG. 4, the policy interface (420) is configured such that an admissions timer (440) in the testing system (400) periodically triggers an admissions check. The admissions check utilizes definitions and methods defined in the policy interface (420) to check whether the system under test is in underflow as to one or more of the system parameters. Underflow typically occurs where the working value of the parameter is below the target steady state value so that additional or more intense workload(s) can be used to bring the working value of the parameter closer to the target steady state value. Rather than prompting periodic checks, the admissions timer (440) could be repeatedly triggered by an event (completion of a workload by the system under test, etc.), or in some other way.

If the system under test is in underflow as to a parameter, then the testing system (400) admits up to as many workloads as the execution context specifies to bring the working value of the parameter closer to the steady state value. As is discussed below, the number of workloads to admit in each admission iteration can be limited to a predetermined maximum number (such as one), by using the ramp-up parameter configuration. Alternatively, the testing system can allow as many admissions in each admission iteration as are needed to reach the steady state value. FIG. 4 illustrates the creation of a single workload (470) by showing an arrow extending from the admissions timer (440) to the policy interface (420), through the execution context interface (410), and to the workload to admit (470). If the system under test is not in underflow, then the testing system makes no admissions in response to the admissions check.

The illustrated testing system (400) is also configured with a cancellations timer (450) that periodically triggers a cancellations check. The cancellations check utilizes definitions and methods defined in the policy interface (420) to check whether the system under test is in overflow as to one or more of the system parameters. Overflow typically occurs where the working value of the parameter is above the target steady state value so that fewer or less intense workload(s) can bring the parameter closer to the target steady state value. As with the admissions timer (440), the cancellations timer (450) could be repeatedly triggered by an event (completion of a workload by the system under test, etc.), the expiration of a periodic interval, or in some other way. Moreover, the admissions check and the cancellations check could be done as a single check, simultaneously as separate checks, as separate checks in a staggered sequential manner, or in some other way.

If the system under test is in overflow as to a parameter, then the testing system (400) cancels up to as many instances of workload as the execution context specifies to bring the working value of the parameter closer to the steady state value. As is discussed below, the number of workloads to cancel in each cancellation iteration can be limited to a predetermined maximum number (such as one), by using the ramp-down parameter configuration. Alternatively, the system can allow as many cancellations in each cancellation iteration as are needed to reach the steady state value. FIG. 4 illustrates the cancellation of a single workload (462) by showing an arrow extending from the cancellations timer (450) to the policy interface (420), through the execution context interface (410), and to the workload to cancel (462). If the system under test is not in overflow, then the testing system makes no cancellations in response to the cancellations check.

Figure 5:
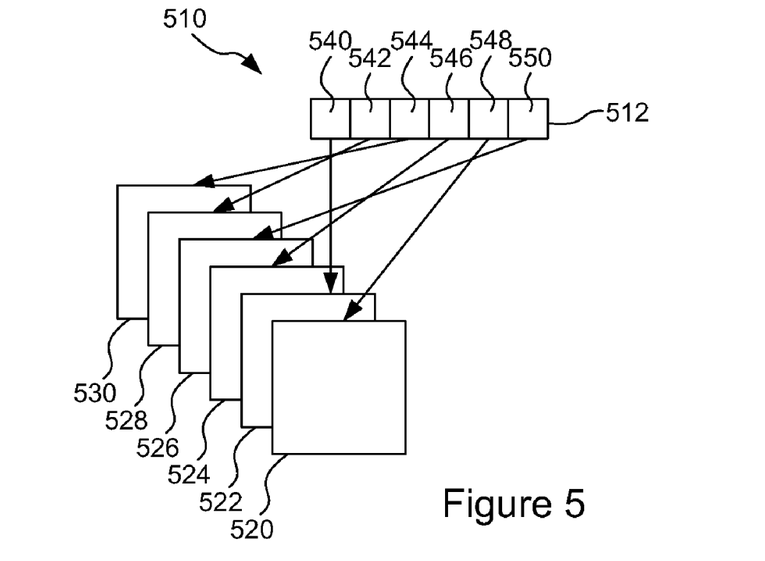
FIG. 5 is a schematic diagram of a dynamic workload sorter that can be used with a computer testing system, such as the system illustrated in FIG. 4.

As illustrated in FIG. 5, the testing system can include a dynamic sorter (510) that dynamically sorts the workloads (520, 522, 524, 526, 528, and 530) residing in the system under test to prioritize which workload(s) to cancel first if one or more workloads are cancelled and/or which ones to adjust up or down if one or more workloads are to be adjusted. The dynamic sorting can be redone each time the cancellations timer prompts a cancellation check, or at some other time.

The dynamic sorting produces one or more dynamically sorted lists (512) with priority slots (540, 542, 544, 546, 548, and 550). For example, the sorter (510) could produce one list to prioritize workloads to cancel, another list to prioritize workloads to adjust to increase usage, and another list for workloads to adjust to decrease usage. In the FIG. 5 illustration, the highest priority slot (540) references one workload (522), and the lowest priority slot (550) references another workload (526). Thus, if this is a cancellation priority list, workload (522) referenced by the highest priority slot (540) would be the first to be cancelled, followed by the remaining workloads in order of priority (528, 530, 524, 520, and 526, respectively). The dynamic sorting can be based on various factors, but it typically seeks to find the workload that can be cancelled or adjusted with the least disruption to the test and the greatest benefit in terms of bringing the working parameter value(s) closest to the target steady state parameter value(s) at that time (although there may be some time lag between the sorting and the actual cancellation or adjustment).

For example, in a scenario where the steady state target parameter value is defined as 100 database transactions per second, a dynamic sorting approach could be to cancel the transaction that acquired the highest number of locks during execution. As another example, where a workload prompts the system under test to perform file operations that append pages into a file, it may be desirable to cancel the workload that was admitted last. This is because cancelling the first one might eliminate a large file and make too much difference in the working value of the system parameter being monitored. Alternatively, cancellation priority could be determined in some other manner, such as first in, first out (FIFO) or priority FIFO.

Steady State Testing Techniques

Figure 6:
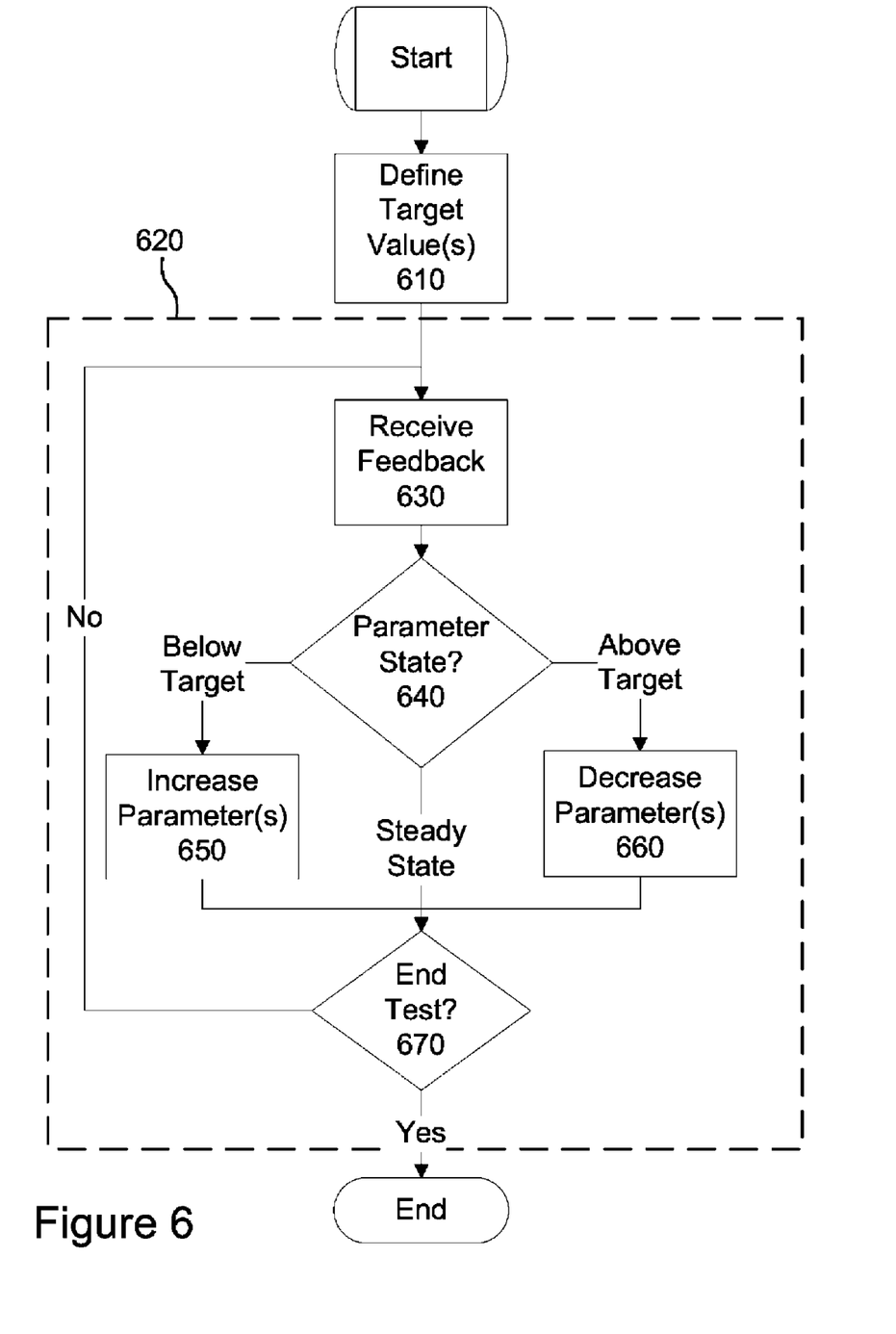
FIG. 6 is a flow diagram depicting an implementation of a steady state computer test.

Referring to FIG. 6, a steady state testing technique is illustrated. A target steady state value for each of one or more system parameters is defined (610) before the computer-implemented test (620) of a system under test begins. Each steady state value may be a precise value or a range, and in either of these scenarios the steady state value can change over time, depending on the type of test (620) to be performed. During the test (620), a testing system repeatedly or continuously receives feedback (630) from the system under test, including information about the working value of the parameters(s). For each such parameter, the testing system reviews feedback from the system under test and determines the parameter state (640), such as by comparing the working value of the system parameter with the steady state value of the system parameter. If the working value of one or more parameters is below the target steady state value, then the testing system operates on one or more workloads to increase working value(s) of the parameter(s) (650), such as by admitting one or more workloads to the system under test. In addition to such admission(s), or as an alternative to them, increasing the parameter (650) could include adjusting the operation of the system under test on workloads that have already been admitted. This could be done by instructing the system under test to perform more work on, or repeat its work on, one or more modules in one or more workloads.

If the working value of one or more parameters is above the target steady state value, then the testing system operates on one or more workloads to decrease the working value of the parameter (660). This can be done by modifying the operation of the system under test on one or more workloads already admitted to the system under test. For example, the system under test can cancel one or more workloads by sending one or more cancellation instructions to the system under test. In addition to such cancellation(s) or as an alternative to them, decreasing the parameter (660) can include adjusting the operation of the system under test on workloads that have already been admitted, such as by instructing the system under test to perform less work on, or skip some work on, one or more modules in one or more workloads.

If the system under test is at the defined steady state for a parameter, then the testing system neither increases nor decreases the working value of the parameter. The testing system can also repeatedly or continuously determine whether the test has come to an end (670). If the test has not come to and end, then the testing system continues to receive feedback (630), determine the parameter state (640), and increase the parameter(s) (650) or decrease the parameter(s) (660), as needed to bring the system under test closer to the defined steady state target value(s) for the chosen system parameter(s). Delays can be present between or within these repetitions, and between those discussed below with reference to FIG. 7. For example, a testing system can determine the state of the parameter(s) and increase or decrease the parameter(s) once per second, or at some other chosen interval. If a predetermined time for the test (620) has expired or the test (620) has otherwise come to an end, then these acts cease.

Determining the parameter state (640) can include determining whether the working value of one or more parameters is above or below the target steady state value. These two determinations (above the target steady state value and below the target steady state value) can be performed at the same time or in sequence. Alternatively, determining the parameter state (640) can include determining whether the working value of one or more parameters is above the target steady state value, but not determining whether the working value of one or more parameters is below the target steady state value. As another alternative, determining the parameter state (640) can include determining whether the working value of one or more parameters is below the target steady state value, but not determining whether the working value of one or more parameters is above the target steady state value. As yet another alternative, determining the parameter state (640) can include determining whether a first subset of parameters is above the target steady state value(s) (but not whether that first subset of parameters is below the target steady state value (s)), and determining whether a second subset of parameters is below the target steady state value(s) (but not whether the second subset of parameters is above the target steady state value(s)).

The testing system may define one or more ramping parameters that limit how quickly the testing system can ramp the system under test up or down to the target steady state. For example, if the system parameter is machine shutdowns per hour, it would likely be desirable to set the ramp-up parameters to small values (i.e., to limit the number of workloads targeted at shutting down machines to a small value during each admission procedure), because the events attempted to be modeled by this steady state definition occur seldom. This could prevent machine shutdowns from occurring so frequently that the system under test would not be able to make progress and be available. In a different test scenario where the system parameter is Web requests failed per second for a Web server system being tested, the parameters would likely be set to high values (i.e., a large number of workload admissions would be allowed during each admission procedure, and a large number of workloads would be allowed to be cancelled during each cancellation procedure). This would allow the testing system to bring the system under test to the target steady state parameter value as quickly as it can. Alternatively, the testing system can allow the admission or cancellation of as many workloads as are needed to bring the system to steady state with each admission and cancellation procedure.

Figure 7:
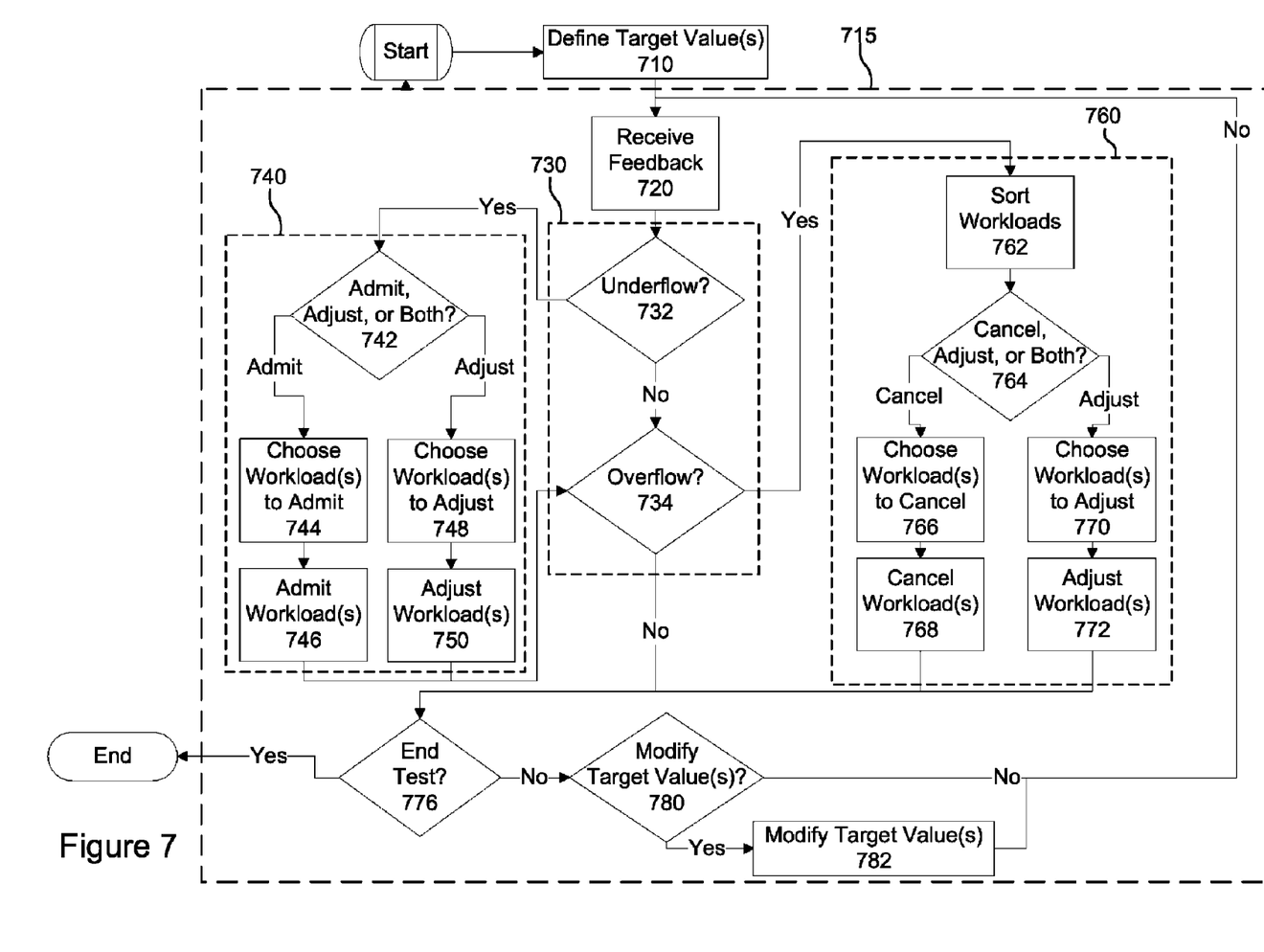
FIG. 7 is a flow diagram also depicting an implementation of a steady state computer test.

Referring to FIG. 7, and describing a more specific implementation of the steady state testing techniques, one or more target steady state values are defined (710), as described above. During a test (715), a testing system receives feedback (720) from a system under test. The testing system is configured to review the feedback and determine the state of chosen system parameter(s) of the system under test (730) by comparing working value(s) of the system parameter(s) with the steady state value(s). Determining the state of the parameter(s) (730) can include determining whether the system is in a state of underflow with respect to the system parameter(s) (732) and/or determining whether the system is in a state of overflow with respect to the system parameter(s) (734). As illustrated, in this implementation the determinations (732 and 734) are made separately and sequentially, possibly with some delay between the two determinations (732 and 734). For example, the underflow determination (732) may be made at a specific interval (e.g., every two seconds), the overflow determination (734) may be made at a specific interval (e.g., every two seconds), and the determinations may be staggered so that one determination (732 or 734) is made at another interval (e.g., every second). However, the determinations could be made simultaneously or as part of a single overall determination of the parameter state. Moreover, one of the determinations could be made without making the other determination. For example, the underflow determination (732) could be made without making the overflow determination (734), or the overflow determination (734) could be made without making the underflow determination (732). In addition, the determinations (732, 734) could be made in a different order, with the overflow determination (734) being made before the underflow determination (732).

If the system under test is in a state of underflow with respect to one or more system parameters, then positive feedback is provided and the testing system operates on one or more workloads to increase one or more working loads on the system under test and thereby increase working value(s) of the system parameter(s) (740). If the system under test is not in a state of underflow, then negative feedback is provided and the testing system does not operate on one or more workloads to increase the working value(s) of the parameter(s). In the illustrated implementation, operating on the one or more workloads to increase the working value(s) of the system parameter(s) (740) includes deciding whether to admit one or more workloads to the system under test to increase the working value(s), adjusting the operation of the system under test on workloads residing in the system under test, or both (742).

If admitting workloads is chosen (or if admitting and adjusting are chosen), then one or more workloads to admit are chosen (744) and then admitted to the system under test (746). Choosing the workloads to admit (744) can include considering the expected effect that admission of the chosen workload(s) will have on the working value(s) of the parameter(s) being monitored. As used herein, the "expected effect" refers to the effect that admission, cancellation, or adjustment of one or more workloads will have on the system under test under normal conditions (or under abnormal conditions if such conditions are currently known to exist, such as in stress testing). For admissions, this effect is a result of the system under test processing one or more admitted workloads. For a cancellation, this effect is a result of the system under test not processing some or all of one or more cancelled workloads. For an adjustment, this effect is the result of the system under test processing one or more workloads as adjusted, rather than as originally admitted. Choosing the workloads to admit (744) can include selecting one or more workloads from multiple different existing workloads, making a new tailored workload (such as from one or more existing workloads or workload modules), selecting or creating execution parameters for new or existing workloads, some combination of these, or some other way of choosing workloads to admit. For example, if a policy implements a target steady state parameter definition of 80% CPU utilization and disk queue length of 2, and the CPU utilization is currently 75% and the disk queue length is currently 3, then a newly created or selected workload can be guided towards achieving more CPU-intensive behavior (such as encryption) and less disk-intensive behavior (such as reading and writing files) through adjusting the workload attributes or selecting a workload with these desired attributes.

If adjusting workloads residing in the system under test is chosen (or if admitting and adjusting are chosen), then increasing the working value(s) of the parameter(s) (740) can include choosing one or more workloads to adjust (748) (which can include dynamically sorting the workloads residing in the system under test and using a dynamically sorted list to choose the workloads to adjust), and adjusting up the operation of the system under test on one or more workloads residing in the system under test (750), such as by instructing the system under test to perform more work on one or more modules in one or more workloads. For example, this could include increasing the system under test's usage of the workload with the lowest usage.

Referring still to FIG. 7, the testing system determines whether the system under test is in a state of overflow with respect to one or more parameters (734). The testing system may receive additional feedback from the system under test prior to determining whether the system under test is in a state of overflow with respect to one or more parameters (734). If the system under test is in a state of overflow with respect to one or more parameters, then positive feedback is provided and the testing system operates on one or more workloads to decrease one or more working loads on the system under test and thereby decrease the working value(s) of the parameter(s) (760). If not, then negative feedback is provided and the testing system does not operate on one or more workloads to decrease working value(s) of the parameter(s). In the illustrated implementation, decreasing the working value(s) of the parameter(s) (760) includes dynamically sorting the workloads in the system under test (762), as discussed above, which can include creating one dynamically sorted list for workloads to cancel and another list for workloads to adjust. Decreasing the working value of one or more parameters (760) can also include deciding whether to cancel one or more workloads from the system under test to decrease the working value(s), adjust the operation of the system under test on workloads residing in the system under test, or both (764).

If cancelling workloads is chosen (or if cancelling and adjusting are chosen), then the workload(s) to cancel are chosen (766) based on a dynamically sorted list. The chosen workload(s) are cancelled (768), such as by sending a cancellation instruction to the system under test. In the example above, where a policy implements a target steady state parameter definition of 80% CPU utilization and disk queue length of 2, and the CPU utilization is currently 75% and the disk queue length is currently 3, the dynamic sorter could read the current run-time workload attributes and return the next workload to be cancelled as the one that has the least CPU utilization and the highest Disk utilization.

If adjusting workloads residing in the system under test is chosen (or if cancelling and adjusting are chosen), then decreasing the working value(s) of the parameter(s) (760) can include choosing one or more workloads to adjust (770) based on a dynamically sorted list, and adjusting down the operation of the system under test on one or more workloads that have already been admitted (772), such as by instructing the system under test to perform less work on one or more modules, or skip work on one or more modules, in one or more workloads. For example, this can include decreasing system under test's usage of the workload with the highest usage.

It is useful with the tools and techniques described herein to have a policy and workloads that are designed together so that when the system under test processes the workloads, the system utilizes resources that vary the types of system parameters that are addressed by the policy. For example, if the testing system is working to maintain a steady state as to CPU utilization, then it is typically beneficial to have CPU-intensive workloads available to be admitted to the system under test. If the testing system is working to maintain steady states as to multiple system parameters, then it is typically beneficial to have the ability to submit workloads that produce varying intensities of loads relating to those different parameters, as with the CPU-intensive workloads and the disk-intensive workloads discussed above.

Referring still to FIG. 7, the testing system can repeatedly or continuously determine whether the test has come to an end (776). If the test has come to an end, then the acts illustrated in FIG. 7 cease. If the test has not come to and end, the testing system can determine whether to modify the target steady state value(s) (780). If the value(s) are to be modified, then the testing system modifies the value(s) (782). As noted above, such modifications could be made to simulate migrating workloads or workload peaks that are common in many types of computer systems. Alternatively, such modifications may be made in response to an event, such as user input. Accordingly, such modifications can allow for added control over testing conditions during the test (715), either by pre-defining modifications to the system parameter(s) during the test or by having a user enter modifications during the test (715). The testing system then continues to receive feedback (720), determine the parameter state (730), and increase the parameter(s) (740) or decrease the parameter(s) (760), as needed to bring the system under test closer to the defined (and possibly modified) steady state target value(s) for the chosen system parameter(s).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer-implemented computer system testing method, comprising:
   defining a target steady state value of each parameter of a set of one or more parameters of a computer system under test; and
   while the system under test is processing one or more of a plurality of test workloads, for each parameter in the set of parameters:
     determining whether a working value of the parameter is below the steady state value of the parameter, and if the working value of the parameter is below the steady state value, then operating on one or more of the workloads to increase the working value of the parameter; and
     determining whether the working value of the parameter is above the steady state value of the parameter, and if the working value of the parameter is above the steady state value, then operating on one or more of the workloads to decrease the working value of the parameter, operating on one or more of the workloads to decrease the working value of the parameter comprising choosing one or more chosen workloads in the system under test to cancel, and instructing the system under test to cancel the one or more chosen workloads, choosing the one or more chosen workloads in the system under test comprising dynamically sorting workloads in the system under test based on runtime feedback from the system under test, and choosing the one or more chosen workloads based on the sorting.

2. The method of claim 1, wherein operating on one or more of the workloads to increase the working value of the parameter comprises admitting one or more workloads to the system under test.

3. The method of claim 1, further comprising modifying the steady state value of at least one parameter of the set of parameters during a continuous test of the system under test, the continuous test comprising a first period of time and a second period of time, such that during the first period of time the steady state value is at a low steady state value, and during the second period of time the steady state value is at a high steady state value that is higher than the low steady state value.

4. The method of claim 1, wherein the testing method comprises a long-haul steady state test of the system under test.

5. The method of claim 1, wherein the steady state value is a range.

6. The method of claim 1, wherein the set of parameters comprises at least two parameters.

7. The method of claim 6, wherein operating on one or more of the workloads to increase the working value of the parameter comprises:
   choosing a workload for admission to the system under test based on an expected effect that the workload will have on the working values of at least two parameters in the set of parameters when the workload is processed by the system under test; and
   admitting the chosen workload to the system under test.

8. The method of claim 6, wherein operating on one or more of the workloads to decrease the working value of the parameter comprises:
   choosing a workload for cancellation from the system under test based on an expected effect that cancellation of the chosen workload will have on the working values of at least two parameters in the set of parameters; and
   cancelling the chosen workload.

9. A computer testing system comprising:
   at least one processor:
   at least one memory storing computer-executable instructions for interfaces comprising:
     an execution context interface comprising information about a system under test, wherein the computer testing system is configured for the at least one processor to use the information about the system under test to communicate with the system under test; and
     a policy interface;
   wherein the at least one memory comprises instructions stored thereon that when executed by the at least one processor cause the at least one processor to perform acts while the system under test is processing one or more workloads admitted to the system under test, the acts comprising:
     using the policy interface to determine, based at least in part on feedback received from the system under test, whether the system under test is in an underflow state with respect to a parameter of the system under test;

operating on one or more workloads to increase a working load on the system under test if the system under test is in the underflow state with respect to the parameter of the system under test;

using the policy interface to determine, based at least in part on feedback received from the system under test, whether the system under test is in an overflow state with respect to the parameter of the system under test; and operating on one or more workloads to decrease the working load on the system under test if the system under test is in an overflow state with respect to the parameter of the system under test, operating on one or more workloads to decrease the working load on the system under test comprising choosing one or more chosen workloads in the system under test to cancel, and instructing the system under test to cancel the one or more chosen workloads, choosing the one or more chosen workloads in the system under test comprising dynamically sorting workloads in the system under test based on runtime feedback from the system under test, and choosing the one or more chosen workloads based on the sorting.

10. The system of claim 9, wherein:

using the policy interface to determine whether the system under test is in an underflow state comprises reviewing feedback from the system under test multiple times while the system under test is processing the one or more workloads; and operating on one or more workloads to increase the working load comprises admitting no more than a predetermined maximum number of admission workloads after each time that the testing system reviews feedback from the system under test.

11. The system of claim 9, wherein:

using the policy interface to determine whether the system under test is in an overflow state comprises reviewing feedback from the system under test multiple times while the system under test is processing the one or more workloads; and operating on one or more workloads to decrease the working load comprises instructing the system under test to cancel no more than a predetermined maximum number of cancellation workloads after each time that the testing system reviews feedback from the system under test.

12. One or more computer-readable storage media containing one or more programs, the one or more programs comprising instructions that are executable by a computer system to perform acts comprising:

receiving feedback from a system under test while the system under test is being tested, the feedback including information about a working value of each parameter in a set of one or more parameters of the system under test; and for each parameter in the set of parameters:

while the system under test is being tested, using the feedback to compare the working value of the parameter with a target steady state value of the parameter; and while the system under test is being tested, operating on one or more workloads to bring the working value of the parameter closer to the steady state value of the parameter, wherein operating on one or more workloads to bring the working value of the parameter closer to the steady state value comprises choosing one or more chosen workloads in the system under test to cancel, and instructing the system under test to cancel the one or more chosen workloads, choosing the one or more chosen workloads in the system under test comprising dynamically sorting workloads in the system under test based on runtime feedback from the system under test, and choosing the one or more chosen workloads based on the sorting.

13. One or more computer readable media as recited in claim 12, wherein the set of parameters comprises at least two parameters.

14. One or more computer readable media as recited in claim 13, wherein using the feedback to compare the working value of the parameter with the steady state value comprises repeatedly using the feedback to compare the working value of the parameter with the steady state value.

15. One or more computer readable media as recited in claim 13, wherein the acts further comprise:

modifying a first steady state value during a continuous test of the system under test, the continuous test comprising a first period of time and a second period of time, such that during the first period of time the first steady state value is at a low first steady state value, and during the second period of time the first steady state value is at a high first steady state value that is higher than the low first steady state value; and modifying a second steady state value during the continuous test, such that during the first period of time the second steady state value is at a high second steady state value, and during the second period of time the second steady state is at a low second steady state value that is lower than the high second steady state value.

16. One or more computer readable media as recited in claim 12, wherein operating on one or more of the workloads to bring the working value of the parameter closer to the steady state value comprises admitting one or more workloads to the system under test.

17. One or more computer readable media as recited in claim 12, wherein operating on one or more of the workloads to bring the working value of the parameter closer to the steady state value comprises adjusting the system under test's usage of a workload already residing in the system under test.

* * * * *